Patented Mar. 3, 1936

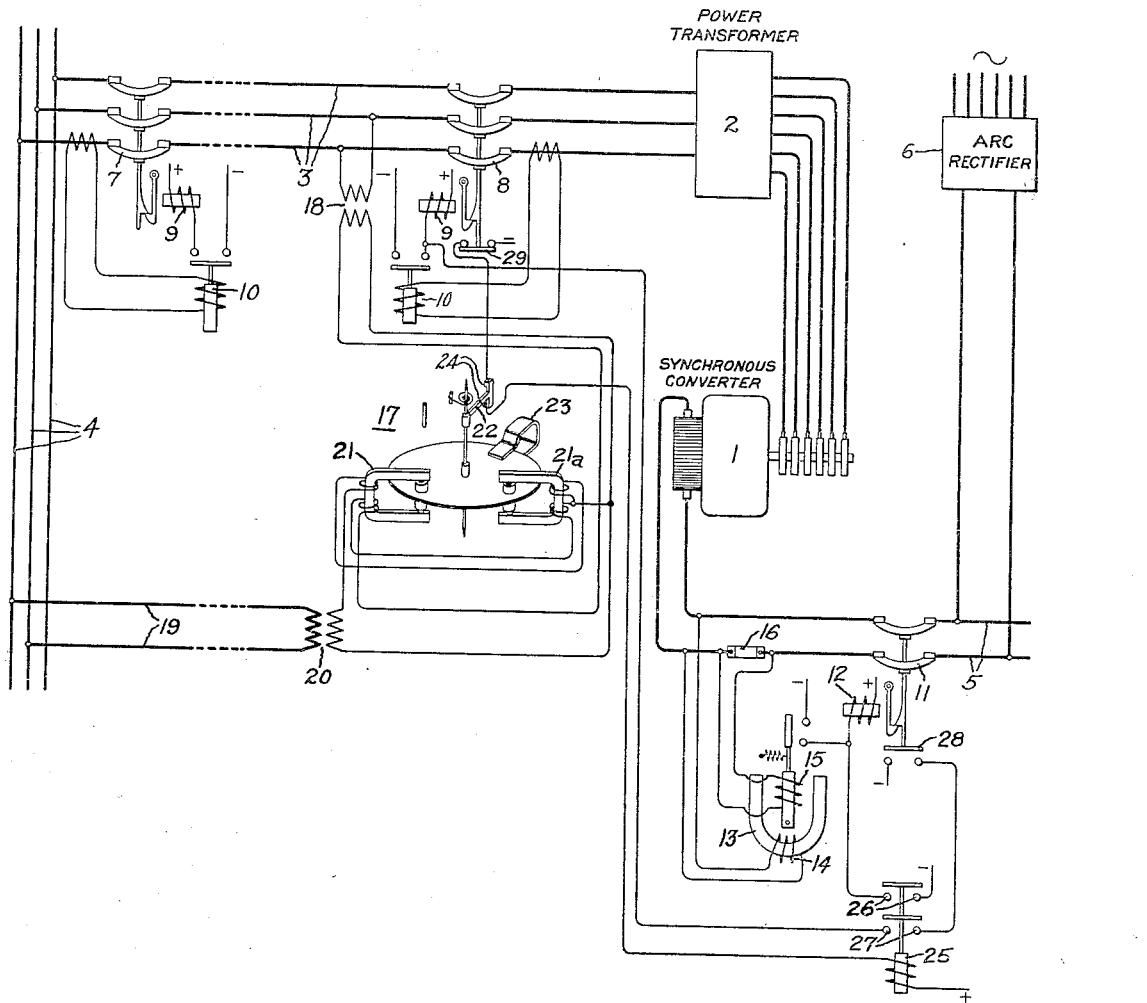

2,032,959

UNITED STATES PATENT OFFICE 2,032,959

PROTECTIVE ARRANGEMENT

Leland F. Stone, Congers, N. Y., assignor to General Electric Company, a corporation of New York Application February 16, 1934, Serial No. 711,564

6 Claims. (Cl. 175—294)

My invention relates to improvements in protective arrangements for electric systems having synchronous converters and an object of my invention is to prevent damage to a converter in case of failure of the alternating current supply and also in case of subsequent reenergization when the supply is restored while the converter is running asynchronously with field excitation as a result of operating inverted, the dissipation of the stored energy of rotation or otherwise.

Synchronous converter installations are usually provided on the direct current side with means for disconnecting the converter from the direct current circuit upon a reversal of the direct current, that is flow of direct current into the converter. Even though the reverse current responsive means is set very sensitively to disconnect from the direct current circuit on motoring current, the stored energy of rotation tends to maintain the converter in operation when the alternating current supply fails and the converter runs asynchronously until it finally comes to rest. If the alternating current supply is restored without following the normal starting procedure while the converter is operating asynchronously, damage is likely to follow.

Also if other rectifying apparatus having a voltage characteristic different from that of the converter, for example another rotary converter and some mercury arc rectifiers, are operated in parallel with the converter, the sensitive reverse current response causes difficulty. Thus, if the characteristic of the other apparatus is such that its voltage increases more rapidly on decreasing load than does the voltage of the converter, the latter is disconnected from the direct current circuit too frequently, and may not be instantly available in case of sudden loads. To avoid this, the sensitivity on reverse current response must be decreased. This sacrifices the protection because the converter operates inverted until the higher reverse current occurs and excessive speeds are likely if the alternating current supply fails under these conditions. Inasmuch as the number of inverted operations depends on the frequency of light load conditions, there are more opportunities for the converter to be motored at dangerous speeds. Also the hazard of restoration of alternating current supply after failure thereof is greater.

In accordance with my invention, I provide means for controlling the alternating current circuit or the direct current circuit or both in accordance with a predetermined relation between a standard or comparison voltage which may be derived from the alternating current source of supply and a voltage which is normally in synchronism with the first voltage and may be derived from the alternating current side of the converter so as to be dependent on the speed thereof. Thus, in accordance with my invention, it is possible to disconnect the alternating current source of supply whenever the predetermined voltage relation exists and thereby eliminate the danger of alternating current excitation at asynchronous speeds and also to prevent excessive speed from inversion, particularly at high current values whereby the frequent disconnection due to operating rectifying apparatus of different characteristics in parallel is avoided.

My invention will be better understood from the following description when considered in connection with the accompanying drawing and its scope will be pointed out in the appended claims.

In the single figure of the accompanying drawing which diagrammatically illustrates a protective arrangement embodying my invention, a synchronous converter 1 is arranged to be connected through a power transformer 2 and a feeder circuit 3 to an alternating current source of supply indicated as a bus 4 and to supply a direct current circuit 5. Other rectifying apparatus such as an arc rectifier 6 suitably connected to operate in parallel with the converter 1 may also supply the direct current circuit 5.

For controlling the circuit of the feeder 3, which is shown partly in broken lines to give a concept of distance, there may be provided at the station where the bus 4 is located and also at the station where the converter 1 is located, suitable circuit interrupting means. For the sake of illustration these are shown as latched closed circuit breakers 7 and 8 each of which is provided with a trip coil 9 and any suitable fault responsive control means therefor such as overcurrent relays 10. Since these form no particular part of my invention, the fault responsive means have been shown for only one phase in order to simplify the drawing. Their application to the other phases is a matter well understood by the art.

For controlling the connection of the converter 1 to the direct current circuit 5 so as to prevent the flow of direct current above a predetermined amount into the converter, there may be provided suitable circuit interrupting means shown as a latched closed circuit breaker 11. This is provided with a trip coil 12 whose circuit is arranged to be controlled by suitable means such as a reverse current relay 13 having a polarizing or voltage winding 14 and a current controlling winding 15 connected across a resistance shunt 16.

In accordance with my invention, I provide means for disconnecting the converter 1 from one of its circuits and preferably both whenever the converter runs asynchronously. For this purpose I may employ a synchronism check relay 17 which is effective to trip the circuit breakers 11 and 8 whenever there is a predetermined phase difference between the voltage at the alternating current end of the converter and a comparison voltage derived from the alternating current source which supplies the converter. These voltages are, of course, normally in synchronism.

The first of these two voltages may be derived from a potential transformer 18 connected to the alternating current end of the converter, as shown, while the second may be derived in any suitable manner independently of the feeder 3, as by an independent circuit 19 and step-down transformer 20. These may be considered schematically to represent a so-called low voltage network system such as is frequently installed in metropolitan areas. Often the stations where the converters are installed have this network service so that the desired comparison voltage is readily available.

Although the type of synchronism check relay employed is immaterial, I have chosen for illustration a relay 17 such as is disclosed in United States Letters Patent 1,680,708, issued August 14, 1928. This relay comprises two opposed induction disk motor elements 21 and 21a which operate on a movable contact controlling member 22 under the influence of a drag magnet 23. The motor element 21 is energized by two windings so connected and arranged as to exert an effect dependent on the sum of the voltages derived from the transformers 18 and 20 while the motor element 21a is energized by two windings so connected and arranged as to exert an effect dependent on the difference between these voltages. The arrangement is such that whenever the voltages are not in synchronism the contact controlling member 22 will be actuated to open the contacts 24 and maintain them open.

In order that the relay 17 may through its contacts 22 and 24 conveniently control the tripping of the circuit breakers 11 and 8, it can, as shown, complete the circuit of an auxiliary relay 25 which will remain energized as long as the converter 1 is in synchronism. The auxiliary relay 25 is to relieve the contacts of the relay 17 from the heavy duty incident to controlling trip coil circuits and also conveniently to provide multiple contacts when desired.

As shown, whenever the auxiliary relay 25 is deenergized, it closes its contacts 26 in the circuit of the trip coil 12 of the direct current circuit breaker 11 and its contacts 27 in the circuit of the trip coil 9 of the alternating current feeder circuit breaker 8. In order to avoid any possibility of excessive motoring speeds during the opening period of the direct current circuit breaker and also to prevent motoring until the circuit breaker 8 is closed, the circuit breakers 11 and 8 may be so interlocked that the former must open first and can be maintained closed after the latter has been closed. One way this can be accomplished is to provide the circuit breaker 11 with an auxiliary switch 28 which closes when the circuit breaker is open and vice versa and which is in series in the circuit of the trip coil 9 of the circuit breaker 8.

Assuming a low load condition such that other rectifiers on the direct current circuit 5 may feed direct current into the converter, then no material harm will occur so long as the alternating current circuit to the converter is intact since the converter will merely tend to feed the source 4. However, if the reverse current exceeds the value for which the relay 13 is set to operate, the direct current circuit breaker 11 will be tripped. This tripping, however, will not be effected under the usual changes in load conditions and the frequency of the operation of the circuit breaker 11 will be reduced.

Assuming, however, that for some reason, for example the opening of the circuit breaker 7, the alternating current supply of the converter is interrupted, then the direct current tends to motor the converter at speeds which may be dangerous. If there is sufficient reverse current, the relay 13 may again effect the opening of the circuit breaker 11. Regardless of whether it does or not, the converter being in motion tends to supply an alternating current and the voltage derived from the potential transformer 18 will no longer be in synchronism with the comparison voltage derived from the circuit 19 and transformer 20. These two voltages will differ not only in phase but also in frequency. Consequently, the synchronism relay 17 will open its contacts 24 thereby deenergizing the auxiliary relay 25 which upon the closing of the contacts 26 and 27 will effect the tripping of the circuit breaker 11 if it has not already been tripped and insure the tripping of the circuit breaker 8 as soon as the auxiliary switch 28 is closed. Inasmuch as the relay 17 cannot reclose its contacts until the two voltages supplied thereto are in synchronism, it will be apparent that any attempt to reclose the circuit breakers 8 and 11 until the sources 3 and 19 are operating synchronously will fail because the auxiliary relay 25, being deenergized, will immediately trip the circuit breakers 8 and 11. If, while the feeder 3 is alive, the circuit breaker 8 opens, an associated auxiliary switch 29, closed when the circuit breaker is closed, will open the circuit of the auxiliary relay 25 and thereby prevent motoring of the converter by causing the opening of the circuit breaker 11.

While I have shown and described my invention in considerable detail, I do not desire to be limited to the exact arrangements shown but seek to cover in the appended claims all those modifications that fall within the true spirit and scope of my invention.

What I claim as new and desire to secure by Letters Patent of the United States, is:

1. A synchronous converter, an alternating current circuit for supplying said converter, a direct current circuit to be supplied by said converter and means responsive to a predetermined phase relation between a voltage corresponding to the speed of the converter and a comparison voltage normally in synchronism with the first voltage for effecting the disconnection of the converter from one of said circuits when the speed of the converter departs from normal.

2. A synchronous converter, an alternating current circuit for supplying said converter, a direct current circuit to be supplied by said converter and means responsive to a predetermined phase relation between a voltage corresponding to the speed of the converter and a comparison voltage normally in synchronism with the first voltage for effecting the disconnection of the converter from each of said circuits in a predetermined sequence when the speed of the converter departs from normal.

3. A synchronous converter, an alternating current circuit for supplying said converter, a direct current circuit to be supplied by said converter and means responsive to a predetermined phase relation between a voltage corresponding to the speed of the converter and a comparison voltage normally in synchronism with the first voltage for effecting the disconnection of the converter first from the direct current circuit and then from the alternating current circuit when the speed of the converter departs from normal.

4. A synchronous converter, an alternating current circuit for supplying said converter, a direct current circuit to be supplied by said converter and means responsive to a predetermined phase relation between a voltage corresponding to the speed of the converter and a comparison voltage normally in synchronism with the first voltage for effecting the disconnection of the converter from both of said circuits when the speed of the converter departs from normal including means for effecting the disconnection from the direct current circuit prior to the disconnection from the alternating current circuit.

5. A synchronous converter, an alternating current circuit for supplying said converter, a direct current circuit to be supplied by said converter and means connected to be energized in accordance with a voltage derived at the alternating current end of the converter and a voltage normally in synchronism with the first voltage and derived from the source of alternating current supplying said converter for disconnecting the converter from one of said circuits when the converter operative in accordance with the phase relation between said voltages runs asynchronously.

6. A synchronous converter, an alternating current circuit for supplying said converter, a direct current circuit to be supplied by said converter, means for deriving a voltage at the alternating current end of the converter, means for deriving from the alternating current source of supply a voltage normally in synchronism with the first voltage and means connected to be energized in accordance with said voltages operative in accordance with the phase relation between said voltages for effecting the disconnection of the converter from the direct current circuit and then from the alternating current circuit when the voltages go out of synchronism.

LELAND F. STONE.